United States Patent Office 3,777,030
Patented Dec. 4, 1973

3,777,030
SULPHUR-CONTAINING 1,4 - DIHYDROPYRIDINE DERIVATIVES FOR CORONARY VESSEL DILATION
Friedrich Bossert, Wuppertal-Elberfeld, and Wulf Vater, Opladen, Germany, assignors to Bayer Aktiengesellschaft, Leverkusen, Germany
No Drawing. Original application Nov. 20, 1970, Ser. No. 91,607, now Patent No. 3,696,112. Divided and this application Feb. 25, 1972, Ser. No. 229,551
Claims priority, application Germany, Dec. 17, 1969, P 19 63 186.8
Int. Cl. A61k 27/00
U.S. Cl. 424—266
24 Claims

ABSTRACT OF THE DISCLOSURE

Sulphur-containing 1,4-dihydropyridine derivatives of the formula:

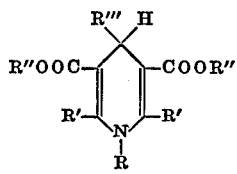

wherein

R is hydrogen, saturated or unsaturated, straight, branched or cyclic alkyl of 1 to 6 carbon atoms, unsubstituted or substituted by hydroxyl or alkoxy of 1 to 3 carbon atoms, or benzyl or phenethyl unsubstituted or substituted in the aryl moiety by 1, 2 or 3 members selected from the group consisting of 1 to 3 alkoxy moieties of 1 to 3 carbon atoms, 1 or 2 alkyl moieties of 1 to 3 carbon atoms and 1 or 2 halogen atoms, R' is straight or branched chain alkyl of 1 to 4 carbon atoms, R" is straight, branched, cyclic, saturated or unsaturated alkyl of 1 to 6 carbon atoms, said alkyl interrupted by 1 or 2 oxygen atoms or said alkyl substituted by hydroxyl, R''' is aryl substituted by $SO_nR_1$ unsubstituted or substituted by 1 to 8 members selected from the group consisting of nitro, amino, acylamino of 1 to 2 carbon atoms, hydroxyl, acyloxy of 1 to 2 carbon atoms, 1 or 2 alkyl moieties of 1 to 4 carbon atoms, 1 or 2 alkoxy moieties of 1 to 4 carbon atoms, and 1 or 2 halogen atoms, $n$ is 0, 1, 2 or 3, and $R_1$ is lower alkyl of 1 to 4 carbon atoms or phenyl when $n$ is 0, 1 or 2 and $R_1$ is hydrogen when $n$ is 3, are useful for their coronary dilating effect and antihypertensive effects. Processes for the production of these compounds are set forth below.

---

This is a division of application Ser. No. 91,607 filed Nov. 20, 1970, now U.S. Pat. No. 3,696,112.

The present invention is concerned with 1,4-dihydropyridine derivatives. More particularly, the present invention is concerned with sulphur-containing 1,4-dihydropyridine derivatives of the formula:

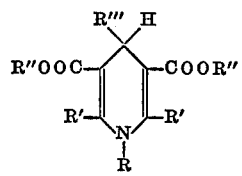

wherein

R is hydrogen, saturated or unsaturated, straight branched or benzyl or phenethyl unsubstituted or substituted in substituted by hydroxy or alkoxy of 1 to 3 carbon atoms, or benzyl or phenethyl unsubstituted or substituted in the aryl moiety by 1, 2 or 3 members selected from the group consisting of 1 to 3 alkoxy moieties of 1 to 3 carbon atoms, 1 or 2 alkyl moieties of 1 to 3 carbon atoms and 1 or 2 halogen atoms, especially fluorine, chlorine or bromine, R' is straight or branched chain alkyl of 1 to 4 carbon atoms, R" is straight, branched, cyclic, saturated or unsaturated alkyl of 1 to 6 carbon atoms, said alkyl interrupted by 1 or 2 oxygen atoms or said alkyl substituted by hydroxyl, R''' is aryl substituted by $SO_nR_1$, unsubstituted or substituted by 1 to 8 members selected from the group consisting of nitro, amino, acylamino of 1 to 2 carbon atoms, hydroxyl, acyloxy of 1 to 2 carbon atoms, 1 or 2 alkyl moieties of 1 to 4 carbon atoms, 1 or 2 alkoxy moieties of 1 to 4 carbon atoms, and 1 or 2 halogen atoms, especially fluorine, chlorine or bromine, $n$ is 0, 1, 2 or 3, and $R_1$ is lower alkyl of 1 to 4 carbon atoms or phenyl when $n$ is 0, 1 or 2 and $R_1$ is hydrogen when $n$ is 3.

These compounds are especially useful for their coronary dilating effect and their antihypertensive effect, and when administered for these purposes, the compounds of the present invention are administered in the same general manner and amount as known coronary dilators and known antihypertensives.

The compounds of the present invention may be produced by reacting an aldehyde of the formula:

$$R'''—CHO$$

wherein R''' is as above defined, with an acyl-fatty acid ester of the formula:

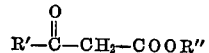

wherein R' and R" are as above defined, and ammonia or an amine of the formula:

$$H_2N—R$$

or a salt thereof, wherein R is as above defined, or with an enamine of the formula:

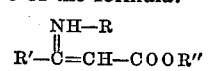

wherein R, R' and R" are as above defined, in organic solvents, such as alcohols, dioxane, glacial acetic acid, dimethylformamide, dimethylsulphoxide or acetonitrile or in water at elevated temperatures, preferably at the boiling point of the solvent.

When the compounds of the present invention are produced, wherein R is other than hydrogen, a preferred embodiment of the process, comprises carrying out the reaction in pyridine. This general process is described in German patent application No. P 19 23 990.8 which corresponds to U.S. application Ser. No. 35,574 filed May 7, 1970, now abandoned.

It is further possible to produce the compounds of the present invention according to teachings set forth in Helv. Chim. Acta 41, (1958) 2066, by oxidizing 1,4-dihydropyridines, wherein R is hydrogen, with an oxidizing agent, quaternizing the resulting pyridine derivatives wth alkyl esters and reducng these again with suitable reducing agents to 1,4-dihydropyridines.

The following specific compounds are representative but not exhaustive examples of the various reactants which can be used according to the present invention:

Aldehydes: 2-, 3- or 4-methylmercaptobenzaldehyde, 2-, 3- or 4-ethylmercaptobenzaldehyde, 2-, 3- or 4-isopropylmercaptobenzaldehyde, 2-, 3- or 4-butylmercaptobenzaldehyde, 4-nitro-6-methylmercaptobenzaldehyde, 4-nitro-5-hydroxy-6-ethylmercaptobenzaldehyde, 2-phenylmercaptobenzaldehyde, 2-, 3- or 4-methylsulphinylbenzaldehyde, 2-, 3- or 4-methylsulphonylbenzaldehyde, 2-, 3- or 4-ethylsulphonylbenzaldehyde, 2-methylsulphinyl-4-nitrobenzaldehyde, 2-methylsulphonyl - 4 - nitrobenzaldehyde, benzaldehyde-2-sulphonic acid, benzaldehyde-3-sulphonic acid, benzaldehyde-4-sulphonic acid, 3-nitrobenzaldehyde-2-sulphonic acid and 4-nitrobenzaldehyde-2-sulphonic acid.

Acyl-fatty acid esters: Formylacetic acid ethyl ester, formylacetic acid butyl ester, acetoacetic acid methyl ester, acetoacetic acid ethyl ester, acetoacetic acid propyl ester, acetoacetic acid isopropyl ester, acetoacetic acid butyl ester, acetoacetic acid ($\alpha$- or $\beta$)-hydroxyethyl ester, acetoacetic acid ($\alpha$- or $\beta$)-methoxyethyl ester, acetoacetic acid ($\alpha$- or $\beta$)-ethoxyethyl ester acetoacetic acid ($\alpha$- or $\beta$)-propoxyethyl ester, acetoacetic acid furfuryl ester, acetoacetic acid tetrahydrofurfuryl ester, acetoacetic acid allyl ester, acetoacetic acid propargyl ester, acetoacetic acid hexyl ester, propionylacetic acid ethyl ester, butyrylacetic acid ethyl ester and isobutyrylacetic acid ethyl ester.

Amines: Methylamine, ethylamine, propylamine, isopropylamine, butylamine, allylamine, propargylamine, 1-hydroxyethylamine-2, 1,3 - dihydroxyisopropylamine, cyclohexylamine, benzylamine, 4-chlorobenzylamine, 3,4-dimethoxybenzylamine and phenethylamine.

According to a preferred embodiment of the present invention, R is hydrogen, alkyl of 1 to 6 carbon atoms and especially 1 to 3 carbon atoms, alkyl of 1 to 6 carbon atoms substituted by hydroxyl and especially alkyl of 1 to 3 carbon atoms substituted by hydroxyl, or benzyl, R'' is alkyl of 1 to 6 carbon atoms, and especially of 1 to 3 carbon atoms, alkenyl of 2 to 6 carbon atoms, and especially 2 or 3 carbon atoms, alkinyl of 2 to 6 carbon atoms, and especially 2 or 3 carbon atoms, or alkyl of 1 to 6 carbon atoms substituted by hydroxyl, especially alkyl of 1 to 3 carbon atoms substituted by hydroxyl, R''' is phenyl $SO_nR_1$ unsubstituted or substituted by a member selected from the group consisting of nitro, amino, acylamino of 1 to 2 carbon atoms, hydroxyl, acyloxy of 1 to 2 carbon atoms, 1 or 2 alkyl moieties of 1 to 4 carbon atoms, 1 or 2 alkoxy moieties of 1 to 4 carbon atoms, and 1 or 2 halogen atoms, and especially nitro, $n$ is 0, 1, 2 or 3 and $R_1$ is alkyl of 1 to 4 carbon atoms, and especially methyl when $n$ is 0, 1 or 2 and $R_1$ is hydrogen when $n$ is 3.

The compounds of the present invention are particularly useful by virtue of the below set forth effects demonstrated in in vivo animal tests:

(1) On parenteral, oral and perlingual administration, the compounds effect a distinct and long-lasting dilation of the coronary vessels. This effect on the coronary vessels is intensified by a simultaneous nitrile-like heart-relieving effect.

They influence and/or modify the heart metabolism in the sense of a saving of energy.

(2) The excitability of the stimulus-forming and excitation-conducting system within the heart is reduced, so that an anti-fluttering effect demonstrable in therapeutic doses results.

(3) The tone of the smooth muscle of the vessels is greatly reduced under the action of the compounds. This vascular-spasmolytic action can occur in the entire vascular system or can manifest itself to a more or less isolated extend in circumscribed vascular regions (such as for example the central nervous system).

(4) The compounds reduce the blood pressure of normal tonic and hypertonic animals and can thus be used as antihypertensive agents.

(5) The compounds possess strong muscular-spasmolytic actions, which manifest themselves on the smooth muscle of the gastric and intestinal tract, the urogenital tract and the respiratory system.

The following non-limitative examples more particularly illustrate the present invention.

EXAMPLE 1

2,6-dimethyl-4-(2'-methylmercaptophenyl)-1,4-dihydropyridine-3,5-dicarboxylic acid dimethyl ester 6 g. of 2-methylmercaptobenzaldehyde together with 10 ccs. of acetoacetic acid methyl ester and 5 ccs. of ammonia in 60 ccs. of methanol are heated to the boil for several hours, the mixture is filtered after addition of charcoal, and after cooling and filtering off, white crystals (9 g.) of melting point 178° (methanol) are obtained.

The following compounds were produced in an analogous manner:

(a) 2,6-dimethyl-4-(4'-methylmercaptophenyl)-1,4-dihydropyridine-3,5-dicarboxylic acid dimethyl ester of melting point 175 to 176° C.

(b) 2,6-dimethyl-4-(2'-methylsulphinylphenyl)-1,4-dihydropyridine-3,5-dicarboxylic acid dimethyl ester of melting point 280° C.

(c) 2,6-dimethyl-4-(2'-methylsulphonylphenyl)-1,4-dihydropyridine-3,5-dicarboxylic acid dimethyl ester of melting point 272° C.

(d) 2,6-dimethyl-4-(2'-methylsulphonylphenyl)-1,4-dihydropyridine-3,5-dicarboxylic acid diethyl ester of melting point 232° C.

(e) 2,6-dimethyl-4-(4'-methylsulphonylphenyl)-1,4-dihydropyridine-3,5-dicarboxylic acid dimethyl ester of melting point 228° C.

(f) 2,6-dimethyl-4-(3'-nitro-4'-methylmercaptophenyl)-1,4-dihydropyridine-3,5-dicarboxylic acid dimethyl ester of melting point 202° C.

(g) 2,6-dimethyl-4-(3'-nitro-6'-methylmercaptophenyl)-1,4-dihydropyridine-3,5-dicarboxylic acid dimethyl ester of melting point 177° C.

(h) 2,6-dimethyl-4-(2'-methylmercaptophenyl)-1,4-dihydropyridine-3,5-dicarboxylic acid diallyl ester (oil).

EXAMPLE 2

1,2,6-trimethyl-4-(4'-methylsulphonylphenyl)-1,4-dihydropyridine-3,5-dicarboxylic acid dimethyl ester 10 g. of 4-methylsulphonylbenzaldehyde, 12 ccs. of acetoacetic acid methyl ester and 4 g. of methylamine hydrochloride in 30 ccs. of pyridine are heated to approx. 100° C. for 1 to 2 hours. After pouring into water, the product is filtered off, washed with water and recrystallized from 500 ccs. of methanol. Light yellow crystals (16 g.) of melting point 188° C. are obtained.

The following compounds were produced in an analogous manner:

(a) 1,2,6-trimethyl-4-(4'-methylmercaptophenyl)-1,4-dihydropyridine-3,5-dicarboxylic acid dimethyl ester, melting point 125° C.

(b) 1,2,6-trimethyl-4-(2'-methylmercaptophenyl)-1,4-dihydropyridine-3,5-dicarboxylic acid dimethyl ester of melting point 125° C.

(c) 1,2,6-trimethyl-4-(4'-methylmercaptophenyl)-1,4-dihydropyridine-3,5-dicarboxylic acid di-($\beta$-ethoxyethyl ester); oil.

(d) 1,2,6-trimethyl-4-(3'-nitro-4'-methylmercaptophenyl)-1,4-dihydropyridine-3,5-dicarboxylic acid dimethyl ester of melting point 131° C.

(e) 1,2,6-trimethyl-4-(2'-mercaptophenyl)-1,4-dihydropyridine-3,5-dicarboxylic acid dipropargyl ester of melting point 86° C.

EXAMPLE 3

2,6-dimethyl-4-(4'-sulphophenyl)-1,4-dihydropyridine-3,5-dicarboxylic acid diethyl ester A solution of 18.5 g. of benzaldehyde-4-sulphonic acid, 26 ccs. of acetoacetic acid ethyl ester and 22 ccs. of ammonia in 250 ccs. of alcohol is heated overnight to the boil, and after cooling the product is filtered off and yields light yellow crystals (20 g.) of melting point 315° C. from alcohol.

The following compounds were produced in an analogous manner:

(a) 2,6-dimethyl-4-(3'-nitro-6'-sulphophenyl)-1,4-dihydropyridine-3,5-dicarboxylic acid diethyl ester of melting point 257° C.

(b) dimethyl-4-(4'-nitro-6'-sulphophenyl)-1,4-dihydropyridine-3,5-dicarboxylic acid diethyl ester of melting point 144° C.

EXAMPLE 4

2,6-dimethyl-4-(4'-methylmercaptophenyl)-1,4-dihydropyridine-3,5-dicarboxylic acid di-(β-ethoxyethyl ester)

7.5 ccs. of 4-methylmercaptobenzaldehyde, 15 ccs. of acetoacetic acid β-ethoxyethyl ester and 5 ccs. of ammonia in 50 ccs. of ethanol are heated to the boil for several hours, after adding animal charcoal the mixture is filtered, and the filtrate is evaporated in vacuo. Purification via ether. Oil; 23 g.

EXAMPLE 5

1-benzyl-2,6-dimethyl-4-(4'-mercaptophenyl)-1,4-dihydropyridine-3,5-dicarboxylic acid dimethyl ester 14 g. of 4-methylmercaptobenzaldehyde, 25 ccs. of acetoacetic acid methyl ester and 10 ccs. of benzylamine in 30 ccs. of pyridine are heated for 5 hours to 90–100° C., the mixture is introduced into ice water and after some hours the product is filtered off. White crystals (16 g.) of melting point 160° C. (methanol).

The following compound was produced in an analogous manner:

(a) 1-β-hydroxyethyl-2,6-dimethyl-4-(4'-methylmercaptophenyl)-1,4-dihydropyridine-3,5-dicarboxylic acid dimethyl ester of melting point 158° C.

The present invention also includes pharmaceutical compositions which comprise one of the above set forth compounds according to the present invention in combination with a pharmaceutically acceptable non-toxic inert diluent or carrier. Said pharmaceutical compositions are made according to the techniques which are per se well known in the art. Any of the usual carriers, diluents, excipients and the like may be utilized according to standard techniques. Such tablets, capsules, dragees, solutions, suspensions and the like form part of the present invention. Also a part of the present invention is the method of effecting coronary action in humans and animals which comprises administering to a human or animal in need thereof a therapeutically effective amount of a compound of the present invention until amelioration of the condition occurs.

What is claimed is:

1. A pharmaceutical composition comprising an effective coronary vessel dilating amount of a compound of the formula:

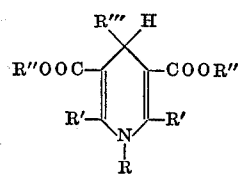

wherein

R is hydrogen, saturated or unsaturated, straight, branched or cyclic alkyl of 1 to 6 carbon atoms, unsubstituted or substituted by hydroxyl or alkoxy of 1 to 3 carbon atoms, or benzyl or phenethyl unsubstituted or substituted in the aryl moiety by 1, 2 or 3 members selected from the group consisting of 1 to 3 alkoxy moieties of 1 to 3 carbon atoms, 1 or 2 alkyl moieties of 1 to 3 carbon atoms and 1 or 2 halogen atoms, R' is straight or branched chain alkyl of 1 to 4 carbon atoms, R'' is straight, branched, cyclic, saturated or unsaturated alkyl of 1 to 6 carbon atoms, said alkyl interrupted by 1 or 2 oxygen atoms or said alkyl substituted by hydroxyl, R''' is phenyl substituted by $SO_nR_1$, unsubstituted or substituted by 1 or 2 members selected from the group consisting of nitro, amino, acylamino of 1 to 2 carbon atoms, hydroxyl, acyloxy of 1 to 2 carbon atoms, 1 or 2 alkyl moieties of 1 to 4 carbon atoms, 1 or 2 alkoxy moieties of 1 to 4 carbon atoms, and 1 or 2 halogen atoms, $n$ is 0, 1, 2 or 3, and $R_1$ is lower alkyl of 1 to 4 carbon atoms or phenyl when $n$ is 0, 1 or 2 and $R_1$ is hydrogen when $n$ is 3, and an inert pharmaceutical carrier.

2. A composition according to claim 1 wherein in said compound,

R is hydrogen, alkyl of 1 to 6 carbon atoms, alkyl of 1 to 6 carbon atoms substituted by hydroxyl, or benzyl, R'' is alkyl of 1 to 6 carbon atoms, alkenyl of 2 to 6 carbon atoms, alkinyl of 2 to 6 carbon atoms or alkyl of 1 to 6 carbon atoms substituted by hydroxyl, R''' is phenyl $SO_nR_1$ unsubstituted or substituted by a member selected from the group consisting of nitro, amino, acylamino of 1 to 2 carbon atoms, hydroxyl, acyloxy of 1 to 2 carbon atoms, 1 or 2 alkyl moieties of 1 to 4 carbon atoms, 1 or 2 alkoxy moieties of 1 to 4 carbon atoms and 1 or 2 halogen atoms, $n$ is 0, 1, 2 or 3, and $R_1$ is alkyl of 1 to 4 carbon atoms when $n$ is 0, 1 or 2 and $R_1$ is hydrogen when $n$ is 3.

3. The composition according to claim 1 wherein said compound is 2,6-dimethyl-4-(2'-methylmercaptophenyl)-1,4-dihydropyridine-3,5-dicarboxylic acid dimethyl ester.

4. The composition according to claim 1 wherein said compound is 2,6-dimethyl-4-(4'-methylmercaptophenyl)-1,4-dihydropyridine-3,5-dicarboxylic acid dimethyl ester.

5. The composition according to claim 1 wherein said compound is 2,6-dimethyl-4-(2'-methylsulphinylphenyl)-1,4-dihydropyridine-3,5-dicarboxylic acid dimethyl ester.

6. The composition according to claim 1 wherein said compound is 2,6-dimethyl-4-(2'-methylsulphonylphenyl)-1,4-dihydropyridine-3,5-dicarboxylic acid dimethyl ester.

7. The composition according to claim 1 wherein said compound is 2,6-dimethyl-4-(2'-methylsulphonylphenyl)-1,4-dihydropyridine-3,5-dicarboxylic acid diethyl ester.

8. The composition according to claim 1 wherein said compound is 2,6-dimethyl-4-(4'-methylsulphonylphenyl)-1,4-dihydropyridine-3,5-dicarboxylic acid dimethyl ester.

9. The composition according to claim 1 wherein said compound is 2,6-dimethyl-4-(3'-nitro-4'-methylmercaptophenyl)-1,4-dihydropyridine-3,5-dicarboxylic acid dimethyl ester.

10. The composition according to claim 1 wherein said compound is 2,6-dimethyl-4-(3'-nitro-6'-methylmercaptophenyl)-1,4-dihydropyridine-3,5-dicarboxylic acid dimethyl ester.

11. The composition according to claim 1 wherein said compound is 2,6-dimethyl-4-(2'-methylmercaptophenyl)-1,4-dihydropyridine-3,5-dicarboxylic acid diallyl ester.

12. The composition according to claim 1 wherein said compound is 1,2,6 - trimethyl-4-(4'-methylsulphonylphenyl) - 1,4-dihydropyridine-3,5-dicarboxylic acid dimethyl ester.

13. The composition according to claim 1 wherein said compound is 1,2,6 - trimethyl-4-(4'-methylmercaptophenyl) - 1,4-dihydropyridine-3,5-dicarboxylic acid dimethyl ester.

14. The composition according to claim 1 wherein said compound is 1,2,6 - trimethyl-4-(2'-methylmercaptophenyl) - 1,4 - dihydropyridine-3,5-dicarboxylic acid dimethyl ester.

15. The composition according to claim 1 wherein said compound is 1,2,6 - trimethyl-4-(4'-methylmercaptophenyl) - 1,4 - dihydropyridine-3,5-dicarboxylic acid di-($\beta$-ethoxyethyl ester).

16. The composition according to claim 1 wherein said compound is 1,2,6-trimethyl-4-(3'-nitro-4'-methylmercaptophenyl) - 1,4-dihydropyridine-3,5-dicarboxylic acid dimethyl ester.

17. The composition according to claim 1 wherein said compound is 1,2,6 - trimethyl-4-(2'-mercaptophenyl)-1,4-dihydropyridine-3,5-dicarboxylic acid dipropargyl ester.

18. The composition according to claim 1 wherein said compound is 2,6 - dimethyl-4-(4'-sulphophenyl)-1,4-dihydropyridine-3,5-dicarboxylic acid diethyl ester.

19. The composition according to claim 1 wherein said compound is 2,6 - dimethyl-4-(3'-nitro-6'-sulphophenyl)-1,4-dihydropyridine-3,5-dicarboxylic acid diethyl ester.

20. The composition according to claim 1 wherein said compound is 2,6 - dimethyl-4-(4'-nitro-6'-sulphophenyl)-1,4-dihyropyridine-3,5-dicarboxylic acid diethyl ester.

21. The composition according to claim 1 wherein said compound is 2,6-dimethyl-4-(4'-methylmercaptophenyl)-1,4 - dihydropyridine-3,5-dicarboxylic acid di-($\beta$-ethoxyethyl ester).

22. The composition according to claim 1 wherein said compound is 1 - benzyl-2,6-dimethyl-4-(4'-mercaptophenyl) - 1,4 - dihydropyridine-3,5-dicarboxylic acid dimethyl ester.

23. The composition according to claim 1 wherein said compound is 1-$\beta$-hydroxyethyl-2,6-dimethyl-4-(4'-methylmercaptophenyl) - 1,4 - dihydropyridine-3,5-dicarboxylic acid dimethyl ester.

24. A method of effecting coronary vessel dilation which comprises administering to a human or animal in need thereof an effective coronary vessel dilating amount of a compound of the formula:

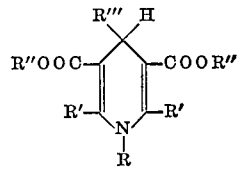

wherein

R is hydrogen, saturated or unsaturated, straight, branched or cyclic alkyl or 1 to 6 carbon atoms, unsubstituted or substituted by hydroxyl or alkoxy of 1 to 3 carbon atoms, or benzyl or phenethyl unsubstituted or substituted in the aryl moiety by 1, 2 or 3 members selected from the group consisting of 1 to 3 alkoxy moieties of 1 to 3 carbon atoms, 1 or 2 alkyl moieties of 1 to 3 carbon atoms and 1 or 2 halogen atoms, R' is straight or branched chain alkyl of 1 to 4 carbon atoms, R'' is straight, branched, cyclic, saturated or unsaturated alkyl of 1 to 6 carbon atoms, said alkyl interrupted by 1 or 2 oxygen atoms or said alkyl substituted by hydroxyl, R''' is phenyl substituted by $SO_nR_1$, unsubstituted or substituted by 1 or 2 members selected from the group consisting of nitro, amino, acylamino of 1 to 2 carbon atoms, hydroxyl, acyloxy of 1 to 2 carbon atoms, 1 or 2 alkyl moieties of 1 to 4 carbon atoms, 1 or 2 alkoxy moieties of 1 to 4 carbon atoms, and 1 or 2 halogen atoms, $n$ is 0, 1, 2 or 3, and $R_1$ is lower alkyl of 1 to 4 carbon atoms or phenyl when $n$ is 0, 1 or 2 and $R_1$ is hydrogen when $n$ is 3.

References Cited
UNITED STATES PATENTS

| | | | |
|---|---|---|---|
| 3,325,505 | 6/1967 | Loev | 260—295.5 R |
| 3,441,648 | 4/1969 | Loev et al. | 260—295.5 R |
| 3,455,939 | 7/1969 | Loev et al. | 260—295.5 R |
| 3,455,945 | 7/1969 | Loev | 260—295.5 R |
| 3,485,847 | 12/1969 | Bossert et al. | 260—295.5 R |
| 3,488,359 | 1/1970 | Bossert et al. | 260—295.5 R |
| 3,511,847 | 5/1970 | Loev et al. | 260—295.5 R |

JEROME D. GOLDBERG, Primary Examiner